B. E. CLOUGH.
ELECTRICAL HORSE POWER COMPUTING MACHINE.
APPLICATION FILED MAR. 4, 1916.

1,221,681.

Patented Apr. 3, 1917.
2 SHEETS—SHEET 1.

Inventor
B. E. Clough,

Witnesses

By
Attorney

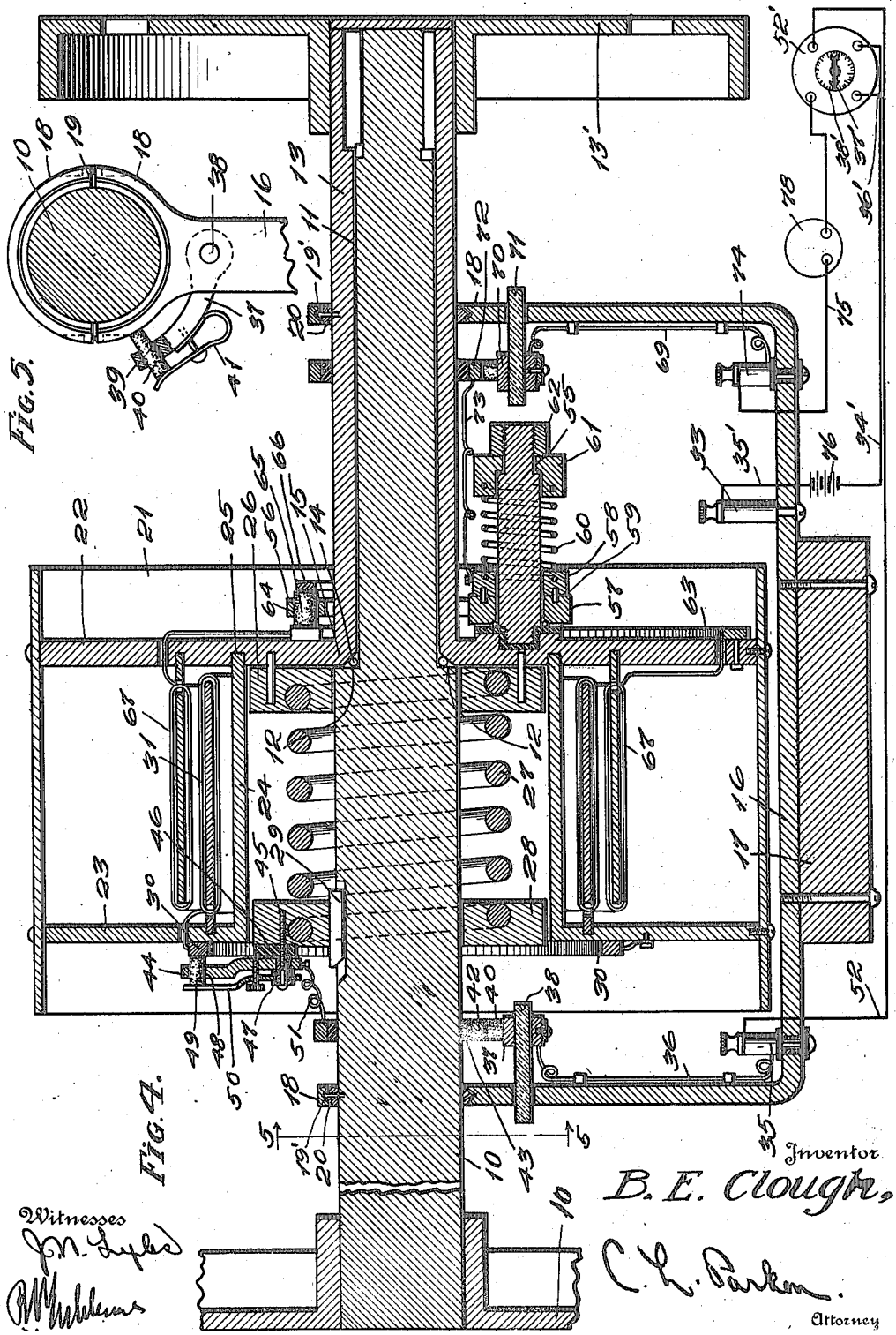

UNITED STATES PATENT OFFICE.

BERT E. CLOUGH, OF BATTLE CREEK, MICHIGAN.

ELECTRICAL HORSE-POWER-COMPUTING MACHINE.

1,221,681. Specification of Letters Patent. Patented Apr. 3, 1917.

Application filed March 4, 1916. Serial No. 82,263.

*To all whom it may concern:*

Be it known that I, BERT E. CLOUGH, a citizen of the United States, residing at Battle Creek, in the county of Calhoun and State of Michigan, have invented certain new and useful Improvements in Electrical Horse-Power-Computing Machines, of which the following is a specification.

My invention relates to improvements in meters for indicating the torque and speed developed by a motor or prime mover, from which the horse power of the motor or prime mover can be conveniently derived.

In the accompanying drawings, forming a part of this specification and in which like numerals are employed to designate like parts throughout the same, Figure 1 is a side elevation of apparatus embodying my invention, Fig. 2 is an end elevation of the same.

Fig. 4 is a central vertical longitudinal sectional view through the apparatus, and, Fig. 5 is a transverse sectional view taken on line 5—5 of Fig. 4.

Figure 1:
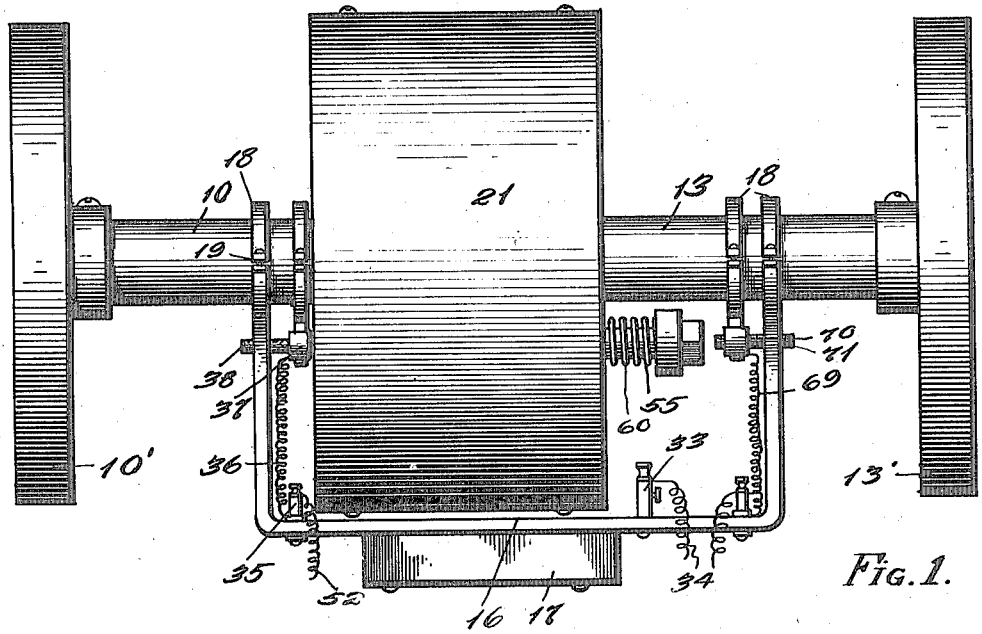

In the drawings, wherein for the purpose of illustration is shown a preferred embodiment of my invention, the numeral 10 designates a shaft, which is preferably horizontally arranged and has a reduced cylindrical end 11, provided with a shoulder 12. Rotatable upon the reduced extension 11 is a sleeve or member 13, adapted to rotate with the shaft 10 and with relation thereto. Bearing balls 14 are arranged between the inner end 15 of the sleeve 13, and the shoulder 12.

The numeral 16 designates a pendant frame, which is approximately U-shaped and normally in a vertical position. The frame 16 has a weight 17 connected with its lower end, as shown. The ends of the vertical arms of this approximately U-shaped frame are provided with cylindrical heads 18, preferably formed in two parts which are bolted together, as shown at 19. These cylindrical heads are provided with interior substantially V-shaped grooves 19′, receiving V-shaped rings 20 which are rigidly mounted upon the shaft 10 and the sleeve 13, as shown. It is thus apparent that the pendant frame 16, while normally retaining the vertical position, does not prevent the proper rotation of the shaft 10 and the sleeve 13, but preventing the longitudinal movement of the sleeve 13, with respect to the shaft 10, as shown.

The numeral 21 designates a rotatable drum, or cylinder, which is rigidly mounted upon a circular or annular flange 22, formed integral with the sleeve 13, as shown. Arranged within the drum 21, near its opposite end, is a coacting ring or flange 23, to the lower end of which is secured a ring 24, rigidly attached to the ring 22, as shown at 25.

Rigidly connected with the flange 22, for rotation therewith and rotatably mounted upon the shaft 10 is a coupling ring 26, having one end of a suitably stiff torque coil spring 27, attached thereto, the opposite end of which is attached to a coupling ring 28, which is keyed to the shaft 10, as shown at 29, or otherwise rigidly secured thereto. From the foregoing description, it is obvious that the relative turning movement which shaft 10 has with relation to the sleeve 13, is opposed by the spring 27.

Figure 2:
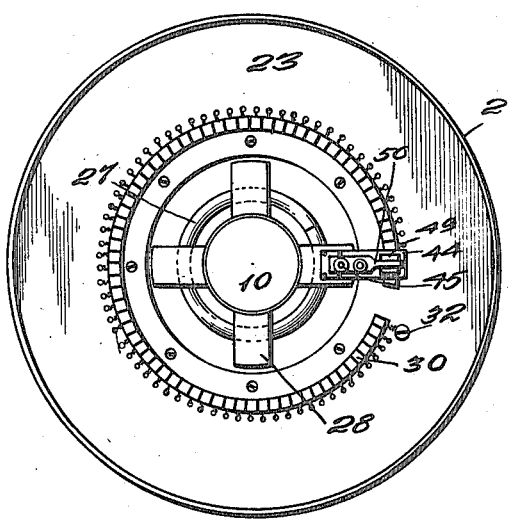

As more clearly shown in Figs. 2 and 4, the flange 23 carries a circular group of contact segments 30, which are insulated therefrom and from each other. Each contact segment has electrical connection with a resistance coil 31, which coils are connected in series. The last contact segment 30 having electrical connection with the last coil 31 to be cut out of circuit, is grounded to the flange 23, as shown at 32, and is hence grounded to the pendant frame 16, this frame carrying a binding post 33, for connection with a wire 34, for a purpose to be described. Connected with and insulated from the frame 16 is a binding post 35, connected with an insulated wire 36. This wire has electrical connection with a pivoted contact arm 37, mounted upon a pivot pin 38, preferably formed of insulating material, and rigidly secured to one arm of the frame 16, as shown. The outer end of the arm 37 is apertured, as shown at 39, for the reception of a carbon brush or contact 40, moved inwardly by a spring 41 and adapted to engage with a contact ring 42, which is rigidly mounted upon the shaft 10 and is insulated therefrom, as shown at 43.

As more clearly shown in Figs. 2 and 4, the numeral 44 designates a contact arm, which is attached to the ring 28 by a screw 45 and insulated from the ring 28, as shown at 46. The outer end of the contact arm 44 is apertured, as shown at 48, receiving a carbon contact brush or element 49, moved inwardly by means of a leaf spring 50. This leaf spring is also held in place by the screw 45, but is insulated therefrom, as shown at 47. The inner end of the contact arm 44 is connected with a wire 51, having electrical connection with the ring 42. It is thus apparent that the contact segments 30 and resistance coils 31 constitute a rheostat, for connection in a circuit, to be described.

Having electrical connection with the binding post 35 is a wire 52. This wire 52 has the pivoted current coil of a wattmeter 52' connected in series therewith. Connected with the opposite end of this pivoted coil is a wire 34', connected with one pole of a source of current 76. The opposite pole of the source of current 76 is connected with the binding post 33 by means of a wire 35'. It is therefore apparent that the amount of current flowing through the pivoted current coil of the wattmeter will be proportional to the amount of resistance cut out by short circuiting the resistance coils 31.

Figure 3:
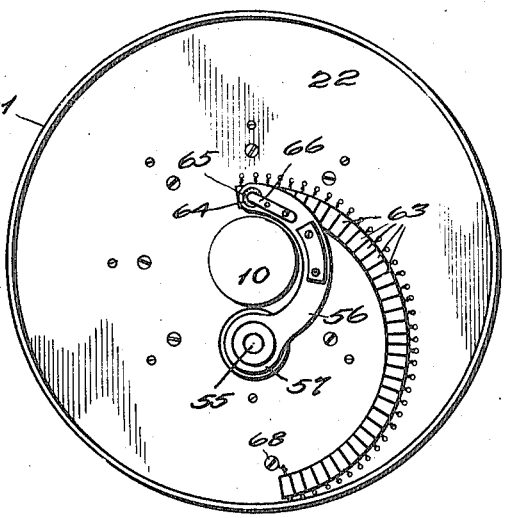
Fig. 3 is an elevation of the opposite end.

As more clearly shown in Figs. 3 and 4, the flange 22 has a stub or trunnion 55, rigidly connected therewith and insulated therefrom. The numeral 56 designates (see Fig. 3) a centrifugally operated crank, having an apertured head 57, pivoted upon the trunnion 55. Rotatable upon the trunnion 55 is a coupling ring 58, locked to the apertured head 57 by means of lugs or bolts 59, as shown. A torque coil spring 60 surrounds the trunnion 55 and has one end attached to the ring 58, while its opposite end is attached to a coupling ring 61, clamped or otherwise rigidly secured to the trunnion 55, by means of a nut 62 or the like. The torque spring 60 is adapted to oppose the outward movement of the crank 56 due to centrifugal force. The numeral 63 designates contact segments, secured to the exterior of the flange 22. These contact segments are insulated from this flange and from each other and are arranged in a semicircular group, concentric with the trunnion or pivot 55. The free end of the crank 56 is apertured, as shown at 64, in Fig. 4, to receive a carbon contact element or brush 65, adapted to engage with the contact segments 63, and moved inwardly by a spring 66. Each contact segment 63 is connected with a resistance coil 67, and these resistance coils are connected in series, as is the usual case in a rheostat construction. The contact segment 63 having connection with the last resistance coil 67 to be cut out of circuit is grounded, to the flange 22, as shown at 68. As clearly shown in Fig. 4, the numeral 69 designates an insulated wire, electrically connected with a pivoted contact arm 70, identical with the contact arm 37. This contact arm is supported by an insulating pivot pin 71, attached to the frame 16. The free end of the contact arm 70 carries a contact member identical with the contact member 40 and this contact member engages a ring 72, carried by the sleeve 13 and thoroughly insulated therefrom. The ring 72 has electrical connection with a wire 73, having electrical connection with the coupling ring 58 and hence with the crank 56.

The wire 69 is connected with the binding post 74, connected with and insulated from the frame 16 and this binding post has a wire 75 connected therewith. The wire 75 has the stationary pressure coil of the wattmeter 52' connected in series therewith, the opposite end of the wire 75 being connected with the wire 34', as shown at 36'. It is thus apparent that the movement of the contact arm 56, due to centrifugal force, will be in proportion to the speed of rotation of the drum, and will properly cut out of resistance, and build up the voltage in the stationary pressure coil of the wattmeter 52', causing the same to properly coöperate with the pivoted current coil, whereby the latter is swung the desired distance. This pivoted current coil has connection with the pointer 37', arranged to travel in proximity to a suitably calibrated scale 38', indicating horse power. If desired, an additional milliammeter 78 may be installed in the wire 75, to indicate the speed at which the horse power is developed.

Rigidly connected with the outer end of the shaft 10 is a wheel 10', and a similar wheel 13' is rigidly connected with the outer end of the sleeve 13.

In the use of the apparatus, the wheel 10 is bolted or otherwise rigidly attached to the wheel or rotatable member of the prime mover or motor, to be tested. The wheel 13' is bolted or otherwise rigidly connected with the rotatable member of the load. Upon the operation of the prime mover, when the load is light, the shaft 10 may not turn perceptibly with relation to the sleeve 13; but as the load increases, the torque spring 27 is placed under additional tension, and the shaft 10 turns with relation to the sleeve 13, while both elements rotate together. At the starting of the prime mover with the light load and before the shaft 10 turns with relation to the sleeve 13, the entire resistance of all of the coils 31 are in a closed circuit with the source of current 76. In this circuit current flows from one pole of the source of current 76, wire 34', the pivoted current coil of the wattmeter 52', the wire 52, binding post 35, wire 36, contact arm 37, contact 40, contact ring 42, wire 51, contact arm 44, contact element 49, the first contact segment 30, all of the resistance coils 31, the last contact segment 30, the ground 32, the flange 23 to the binding post 33, and through wire 35' back to the opposite pole of the source of current. As the shaft 10 is turned with relation to the sleeve 13, in advance thereof, the contact arm 44 carries the contact brush 49 over certain of the contact segments 30, thus cutting out of circuit any suitable number of the resistance coils, causing a proportional increase in the flow of current through the pivoted current coil of the wattmeter 52', indicating the torque of the prime mover being tested. During the rotation of the drum 21, the crank 56 is thrown outwardly by centrifugal force, whereby its contact brush 65 travels over certain of the contact segments 63, cutting out of circuit a corresponding number of the resistance coils 67. This builds up the voltage in the stationary pressure coil of the wattmeter 52'. In the circuit including the pressure coil of the wattmeter, current flows from one side of the source of current 76, through wire 34', the stationary pressure coil of the wattmeter, wire 75, binding post 74, wire 69, contact member 70, contact ring 72, wire 73, contact arm 56, contact brush 65, the selected contact segment 63, the resistance coils 67 in series therewith, the grounded contact segment 63, the ground 68, flange 22, binding post 33, and through wire 35' back to the opposite pole of the source of current. It is thus apparent that the voltage in the stationary pressure coil of the wattmeter will be increased in proportion to the resistance cut out by the movement of the crank 56.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In apparatus of the character described, a rotatable member, a coacting member rotatable with the first named member and with relation thereto, yielding means connecting the members to oppose the turning movement of one member with relation to the other, a rheostat comprising contact segments carried by one member and a contact element carried by the other member, a wattmeter comprising current and pressure coils, a circuit connected with the rheostat and including the current coils of the wattmeter, a rheostat carried by one member, centrifugal means actuated by one member to operate the last named rheostat, and a circuit connected with the second named rheostat and including the pressure coils of the wattmeter.

2. In apparatus of the character described, means for determining the torque of a prime mover, a rheostat operated by the means, a wattmeter comprising current and pressure coils, a circuit connected with the rheostat and including the current coils of the wattmeter, means for determining the speed of rotation of the prime mover, a second rheostat operated by the speed determining means, and a circuit connected with the second named rheostat and including the pressure coils of the wattmeter.

3. In apparatus of the character described, a rotatable shaft, a sleeve rotatably mounted upon a portion of the shaft, an attaching member carried by the shaft, an attaching member carried by the sleeve, a torque coil spring connecting the sleeve and shaft, a supporting member carried by the sleeve and rotatable therewith, contact segments carried by the supporting member, a plurality of resistance coils carried by the supporting member and connected with the contact segments, a contact element carried by the shaft to be rotated thereby and to engage with the contact segments, a pendant frame pivoted upon the shaft and sleeve and grounded to one side of the resistance coils, a contact ring carried by the shaft and having electrical connection with the contact element, a second contact element carried by the pendant frame and engaging the ring, and a source of current having one pole connected with the second named contact element and the other pole with the pendant frame.

4. In apparatus of the character described, a rotatable member, a coacting rotatable member adapted to turn with relation to the first named rotatable member, a support carried by one rotatable member, a plurality of sets of resistance coils carried by the support, a set of contact plates carried by the support and connected with one set of coils, a contact member connected with the first named rotatable member and adapted to contact with the contact plates, indicating mechanism, a circuit connected with the contact member, the last named set of resistance coils and the indicating mechanism, a second set of contact plates carried by the support and connected with the other set of coils, a centrifugally operated device carried by the support and having a contact member to contact with the second named set of contact plates, and a circuit connected with the second named contact plates, the second named set of coils, and the indicating mechanism.

In testimony whereof I affix my signature in presence of two witnesses.

BERT E. CLOUGH.

Witnesses:
 ALBERT N. FORD,
 MAXWELL B. ALLEN.